(12) United States Patent
Epstein et al.

(10) Patent No.: US 8,762,727 B2
(45) Date of Patent: *Jun. 24, 2014

(54) VERIFYING A NODE ON A NETWORK

(75) Inventors: Michael A. Epstein, Spring Valley, NY (US); Frederic Grumiaux, Brussels (BE)

(73) Assignee: Koninklijke Philips N.V., Eindhoven (NL)

( * ) Notice: Subject to any disclaimer, the term of this patent is extended or adjusted under 35 U.S.C. 154(b) by 1967 days.

This patent is subject to a terminal disclaimer.

(21) Appl. No.: 10/529,778

(22) PCT Filed: Sep. 22, 2003

(86) PCT No.: PCT/IB03/04123
§ 371 (c)(1),
(2), (4) Date: Mar. 30, 2005

(87) PCT Pub. No.: WO2004/030312
PCT Pub. Date: Apr. 8, 2004

(65) Prior Publication Data
US 2006/0294362 A1    Dec. 28, 2006

Related U.S. Application Data

(60) Provisional application No. 60/445,263, filed on Feb. 5, 2003, provisional application No. 60/414,944, filed on Sep. 30, 2002.

(51) Int. Cl.
*H04L 29/06* (2006.01)
*H04L 12/24* (2006.01)

(52) U.S. Cl.
CPC .......... *H04L 63/061* (2013.01); *H04L 41/5009* (2013.01)
USPC ............................. 713/171; 713/168; 709/238

(58) Field of Classification Search
CPC ........................ H04L 63/061; H04L 41/5009
USPC ........................ 713/153, 168–171; 709/238
See application file for complete search history.

(56) References Cited

U.S. PATENT DOCUMENTS 6,003,079 A * 12/1999 Friedrich et al. ............. 709/224
6,088,450 A * 7/2000 Davis et al. .................. 713/182
(Continued)

FOREIGN PATENT DOCUMENTS

JP    S6354042 A    3/1988
JP    02002757 A    8/1990
(Continued)

OTHER PUBLICATIONS

Using Encryption for Authentication in Large Networks of Computers Roger Needham and Michael Schroeder, Communications of the ACM, Dec. 1978, vol. 21, No. 12, pp. 993-999.*

(Continued)

*Primary Examiner* — Michael Pyzocha

(57) ABSTRACT

A system and method includes timing parameters within a node-verification protocol, such as OCPS, to facilitate a determination of the proximity of a target node to a source node. The node-verification protocol includes a query-response sequence, wherein the source node communicates a query to the target node, and the target node communicates a corresponding response to the source node. The source node establishes a lower bound on the distance between the source node and the target node based on a measure of the time required to effect this query-response sequence. The time required to effect this sequence includes the time required to communicate the query and response, as well as the time required to process the query and generate the response. The target node includes a measure of the time required to process the query and generate the response to the source node. The source node subtracts this time from the total query-response time to determine the time consumed for the communication. This communication time is compared to a threshold value to determine whether the target node is local or remote relative to the source node.

21 Claims, 1 Drawing Sheet

(56) References Cited

U.S. PATENT DOCUMENTS

| | | | |
|---|---|---|---|
| 6,192,404 B1 * | 2/2001 | Hurst et al. | 709/224 |
| 6,223,286 B1 * | 4/2001 | Hashimoto | 713/178 |
| 6,363,477 B1 * | 3/2002 | Fletcher et al. | 713/151 |
| 6,367,018 B1 * | 4/2002 | Jain | 726/2 |
| 6,446,028 B1 * | 9/2002 | Wang | 702/186 |
| 6,717,915 B1 * | 4/2004 | Liao et al. | 370/252 |
| 7,036,010 B2 * | 4/2006 | Wray | 713/151 |
| 2003/0184431 A1 * | 10/2003 | Lundkvist | 340/5.2 |

FOREIGN PATENT DOCUMENTS

| | | |
|---|---|---|
| JP | H04321348 A | 11/1992 |
| JP | H0955740 A | 2/1997 |
| JP | 11203220 A | 7/1999 |
| JP | 2002171551 A | 6/2002 |

OTHER PUBLICATIONS

Stevens et al: "TCP/IP Illustrated, vol. 1, The Protocols", Professional Computing Series, Reading, MA, Addison Wesley, US, vol. 1, 1994, pp. 85-96, XP002106390.

Needham et al, "Using Encryption for Authentication in Large Networks of Computers", Communications of the ACM, vol. 21, No. 12, Dec. 1978, pp. 993-999.

Francis et al, "An Architecture for a Global Internet Host Distance Estimation Service", Eighteenth Annual Joint Conference of the IEEE Computer and Communications Societies, Mar. 1999, p. 210-217.

* cited by examiner

VERIFYING A NODE ON A NETWORK

This application claims the benefit of U.S. provisional application 60/414,944 filed on 30 Sep. 2002.

TECHNICAL FIELD

This invention relates to the field of communications security, and in particular, to a system and method that verifies the proximity of a node on a network.

BACKGROUND ART

Network security can often be enhanced by distinguishing between 'local' nodes and 'remote' nodes on the network. Local nodes, for example, are typically located within a particular physical environment, and it can be assumed that users within this physical environment are authorized to access the network. Remote nodes, on the other hand, are susceptible to unauthorized physical access. Additionally, unauthorized intruders on a network typically access the network remotely, via telephone or other communication channels. Because of the susceptibility of the network to unauthorized access via remote nodes, network security can be enhanced by imposing stringent security measures, or access restrictions, on remote nodes, while not encumbering local nodes with this same restrictions.

DISCLOSURE OF INVENTION

It is an object of this invention to provide a system and method that facilitates a determination of whether a node on a network is local or remote. It is a further object of this invention to provide a system and method that facilitates a secure determination of whether a node on a network is local or remote. It is a further object of this invention to integrate this determination with a system or method that verifies the authenticity of the node on the network.

These objects and others are achieved by a system and method that includes timing parameters within a node-verification protocol, such as the Open Copy Protection System (OCPS), to facilitate a determination of the proximity of a target node to a source node. The node-verification protocol includes a query-response sequence, wherein the source node communicates a query to the target node, and the target node communicates a corresponding response to the source node. The source node establishes a lower bound on the distance between the source node and the target node, based on a measure of the time required to effect this query-response sequence. The time required to effect this sequence includes the time required to communicate the query and response, as well as the time required to process the query and generate the response. The target node includes a measure of the time required to process the query and generate the response to the source node. The source node subtracts this time from the total query-response time to determine the time consumed for the communication. This communication time is compared to a threshold value to determine whether the target node is local or remote relative to the source node.

BRIEF DESCRIPTION OF THE DRAWINGS

Throughout the drawings, the same reference numeral refers to the same element, or an element that performs substantially the same function.

BEST MODE FOR CARRYING OUT THE INVENTION

Figure 1:
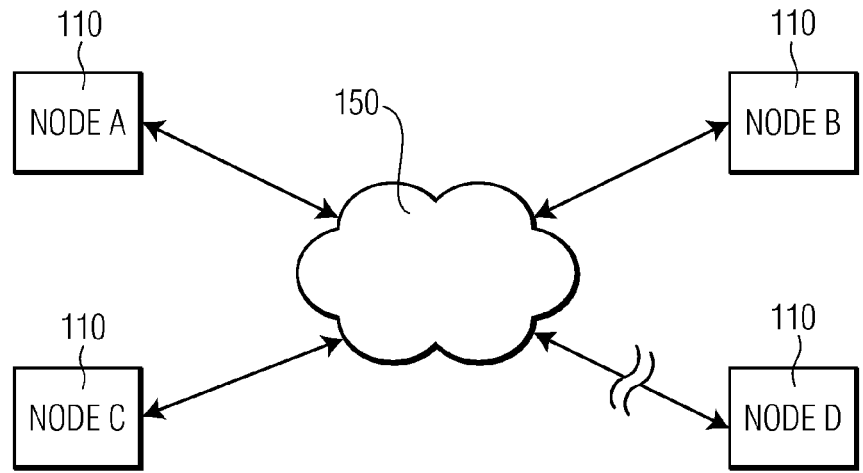
FIG. 1 illustrates an example block diagram of a network of nodes.

FIG. 1 illustrates an example block diagram of a network 150 of nodes 110. One of the nodes, NodeD 110, is illustrated as being distant from the other nodes 110. In accordance with this invention, each of the nodes 110 is configured to be able to determine the proximity of each other node 110. In a typical embodiment of this invention, the proximity determination is limited to a determination of whether the other node is "local" or "remote", although a more detailed determination of distances can be effected using the techniques disclosed herein.

Figure 2:
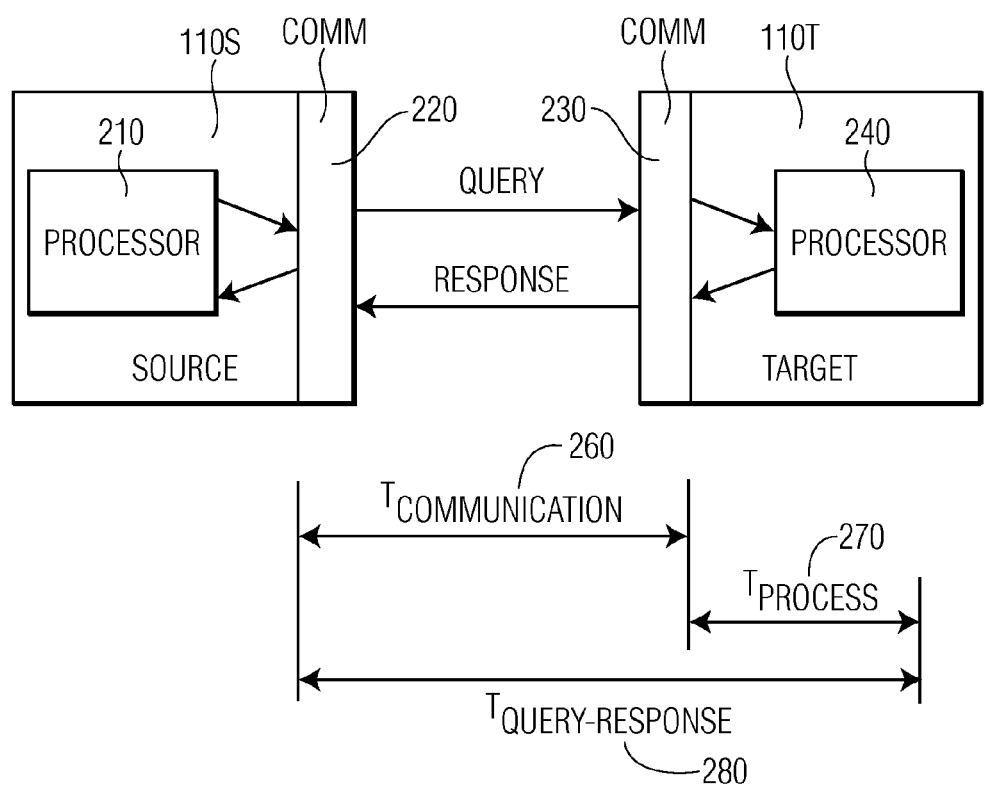
FIG. 2 illustrates an example block diagram of a source and target node that effect a query-response protocol in accordance with this invention.

FIG. 2 illustrates an example block diagram of a source node 110S and target node 110T that effect a query-response protocol to determine the proximity of the target node 110T to the source node 110S in accordance with this invention. The source node 110S includes a processor 210 that initiates a query, and a communications device 220 that transmits the query to the target node 110T. The target node 110T receives the query and returns a corresponding response, via its communications device 230. To assure that the response corresponds to the communicated query, the protocol calls for the target node 110T to process at least a portion of the query and to include a result of this processing in the response, via a processor 240.

The source node 110S is configured to measure the time consumed by the query-response process, illustrated in FIG. 2 as $T_{query\text{-}response}$ 280. This query-response time 280 includes the time to communicate the query and response, $T_{communicate}$ 260, as well as the time to process the query and generate the response at the target node 110T, $T_{process}$ 270. In accordance with this invention, the target node 110T is configured to include a measure of this processing time 270 within the response provided to the source node 110S. The source node 110S subtracts the processing time 270 from the query-response time 280 to determine the communication time 260. Using known techniques, the distance between the source 110S and target 110T can be calculated using this determined communication time 260. As noted above, in a typical embodiment, the communication time 260 is used to determine whether the target 110T is local or remote from the source 110S. This determination is made in a preferred embodiment of this invention by comparing the communication time 260 to a nominal threshold value, typically not more than a few milliseconds. If the communication time 260 is below the threshold, the target 110T is determined to be local; otherwise, it is determined to be remote.

In a typical embodiment, the source 110S uses the remote/local proximity determination to control subsequent communications with the target 110T. For example, some files may be permitted to be transferred only to local nodes, all communications with a remote node may be required to be encrypted, and so on. Optionally, multiple threshold levels may be defined to distinguish different ranges of distances, such as whether a remote target node is located within the same country as the source node, and so on.

Note that an unauthorized node can subvert the above process by providing a false processing time. In a preferred embodiment of this invention, the above query-response process is integrated within a node-authentication process, such as a key-exchange process, which typically includes one or more query-response sequences. By integrating the query-response process within the node-authentication process, the reported processing time is verified as being authentic.

The OCPS protocol, for example, includes an authentication stage, a key exchange stage, a key generation phase, and subsequent data transmission phases. The key exchange phase is effected via a modified Needham-Schroeder key exchange protocol, as described in "Handbook of Applied Cryptography", Menezes et al.

At the authentication stage, each of the source 110S and target 110T nodes authenticates a public key of each other.

At the start of the key exchange phase, the source 110S encrypts a random number and a random key, using the public key of the target 110T, and transmits both encryptions to the target 110T. In accordance with this invention, the source node 110S initiates a timer when these encryptions are transmitted to the target 110T.

The target 110T decrypts the random number and random key, using the private key of the target. The target 110T generates a new random number and a new random key, and encrypts the new random number, the new random key, and the decrypted random number from the source 110S, using the public key of the source 110S, to form a response that is to be communicated to the source 110S. The target 110T optionally signs the response, using the target's private key. In accordance with this invention, the target 110T also includes a measure of the time required to effect the decryption, encryption, and signing within the signed response. This processing time is optionally encrypted using the public key of the source. Because this decryption, encryption, and signing process generally consumes the same amount of time at a given target node, the target node is preferably configured to provide a predefined processing time as the measure of time to effect this processing. By signing the response, the target 110T binds the reported processing time to the other parameters in the current response, thereby precluding an unauthorized replacement of the encrypted processing time with an alternative time that is encrypted using the public key of the source 110S.

When the source node 110S receives the response, it terminates the aforementioned timer. The source node 110S verifies the signed message, using the public key of the target 110T, and decrypts the random numbers and random key from the response, using the private key of the source 110S. If the processing time within the response is encrypted, it is also decrypted at this time by the source 110S, using the private key of the source 110S. In accordance with this invention, the source 110S subtracts the processing time from the time duration measured by the timer between the transmission of the encrypted query from the source 110S and the reception of the encrypted response from the target 110T to determine the round-trip communication time between source 110S and target 110T.

To confirm the key exchange, the source 110S transmits the decrypted new random number back to the target 110T. Both the source 110S and target 110T control subsequent communications based upon receipt of the proper decrypted random numbers. In accordance with this invention, the source 110S also controls subsequent communications based upon the determined communication time.

If both nodes are verified, subsequent communications between the source 110S and target 110T encrypt the communications using a session key that is a combination of the random keys, the public keys, and a session index.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the above described OCPS protocol, the target node 110T may also be configured to determine the proximity of the source node 110S, by timing the process between the transmission of the encrypted response and the receipt of the decrypted random number from the source 110S. In this embodiment, the source 110S is configured to include a measure of the time required to process the encrypted response and transmit the decrypted random number in the last key exchange message that includes the decrypted random number, digitally signed by the source 110S. The target 110T subtracts this processing time from its measured time between transmission and receipt to determine the round-trip target-source-target communication time, and thus the proximity of the source 110S to the target 110T. These and other system configuration and optimization features will be evident to one of ordinary skill in the art in view of this disclosure, and are included within the scope of the following claims.

The invention claimed is:

1. A method of determining proximity of a target node to a source node, comprising:
   communicating a query from the source node to the target node,
   communicating a response from the target node to the source node, the response from the target node including a measure of processing time required to generate the response based on the query,
   receiving the response at the source node,
   determining a measure of query-response time between communicating the query and receiving the response, and
   determining the proximity of the target node based on a communication time that depends upon a difference between the measure of query-response time and the measure of processing time.

2. The method of claim 1, wherein the query and response correspond to at least a portion of a cryptographic key-exchange protocol.

3. The method of claim 2, wherein the key-exchange protocol corresponds to a Needham-Schroeder key-exchange protocol.

4. The method of claim 1, wherein the query and response correspond to at least a portion of an OCPS protocol.

5. The method of claim 1, wherein the measure of processing time at the target node is predefined.

6. The method of claim 1, wherein determining the proximity includes comparing the communication time to a threshold value that distinguishes between local and remote nodes.

7. The method of claim 1, further including restricting communications with the target node based on the proximity.

8. The method of claim 1, wherein the response is cryptographically signed by the target node.

9. A node on a network including:
   a communication device that is configured to receive a query from a source node and to transmit a corresponding response to the source node,
   a processor that is configured to process the query and produce therefrom the response,
   wherein
   the response includes a measure of processing time required to process the query and produce the response.

10. The node of claim 9, wherein the processor is configured to process the query and produce the response as part of a cryptographic key-exchange protocol.

11. The node of claim 10, wherein the key-exchange protocol corresponds to a Needham-Schroeder key-exchange protocol.

12. The node of claim 9, wherein the query and response correspond to at least a portion of an OCPS protocol initiated by the source node.

13. The node of claim 9, wherein the measure of processing time is predefined.

14. The node of claim 9, wherein the processor is further configured to cryptographically sign the response.

15. A node on a network including:
   a communication device that is configured to transmit a query to a target node and to receive a corresponding response from the target node, the response from the target node including a measure of processing time required to generate the response at the target node, and
   a processor that is configured to:
      generate the query,
      receive the response,
      measure a query-response time between generating the query and receiving the response, and
      determine a proximity of the target node relative to the node based on a communication time that is dependent upon a difference between the query-response time and the measure of processing time.

16. The node of claim 15, wherein the processor is configured to generate the query and receive the response as part of a cryptographic key-exchange protocol.

17. The node of claim 16, wherein the key-exchange protocol corresponds to a Needham-Schroeder key-exchange protocol.

18. The node of claim 15, wherein the query and response correspond to at least a portion of an OCPS protocol initiated by the node.

19. The node of claim 15, wherein the measure of processing time is predefined.

20. The node of claim 15, wherein the processor is configured to determine the proximity based on a comparison of the communication time to a threshold value that distinguishes between local and remote nodes.

21. The node of claim 15, wherein the processor is further configured to control subsequent communications with the target node based on the proximity.

* * * * *